United States Patent
Wang et al.

(10) Patent No.: US 7,294,077 B2
(45) Date of Patent: Nov. 13, 2007

(54) CVT BELT WITH CHROMIUM NITRIDE COATING

(75) Inventors: Yucong Wang, West Bloomfield, MI (US); Sohail A. Khan, Farmington, MI (US); Beizhi Zhou, Troy, MI (US); Reuben Sarkar, Graz (AT); Michael J. Lukitsch, Port Huron, MI (US); Yang-Tse Cheng, Rochester Hills, MI (US); Anita M. Weiner, West Bloomfield, MI (US)

(73) Assignee: General Motors Corporation, Deteroit, MI (US)

( * ) Notice: Subject to any disclaimer, the term of this patent is extended or adjusted under 35 U.S.C. 154(b) by 669 days.

(21) Appl. No.: 10/785,691

(22) Filed: Feb. 24, 2004

(65) Prior Publication Data

US 2005/0187056 A1 Aug. 25, 2005

(51) Int. Cl.
  *F16G 1/20* (2006.01)
  *F16G 1/26* (2006.01)
  *B29D 29/00* (2006.01)
(52) U.S. Cl. .................. 474/201; 474/242; 156/137
(58) Field of Classification Search ................ 474/201, 474/242, 237–238, 8; 72/11, 49, 111; 418/63, 418/178; 508/192, 291, 391, 432; 277/443; 29/33; 156/137–138
See application file for complete search history.

(56) References Cited

U.S. PATENT DOCUMENTS

| | | | | |
|---|---|---|---|---|
| 4,741,727 A | * | 5/1988 | Hattori et al. .............. 474/242 |
| 5,123,879 A | * | 6/1992 | Lecouturier et al. ........ 474/242 |
| 5,171,189 A | * | 12/1992 | Douhairet et al. .......... 474/201 |
| 5,951,273 A | * | 9/1999 | Matsunaga et al. ........... 418/63 |
| 6,149,162 A | * | 11/2000 | Tanaka et al. .............. 277/443 |
| 6,161,837 A | * | 12/2000 | Shureb ....................... 277/443 |
| 6,254,503 B1 | | 7/2001 | Chiba et al. ................... 474/8 |
| 6,337,309 B1 | | 1/2002 | Watts et al. ................ 508/291 |
| 6,451,745 B1 | | 9/2002 | Ward .......................... 508/192 |
| 6,464,606 B2 | | 10/2002 | Brandsma et al. .......... 474/242 |
| 6,497,633 B1 | | 12/2002 | Butterfield et al. ......... 474/237 |
| 2006/0144112 A1 | * | 7/2006 | Nakajima et al. ............. 72/111 |

FOREIGN PATENT DOCUMENTS

| EP | 0470359 A2 | * | 1/1991 |
| EP | 1176224 A2 | * | 1/2002 |
| JP | 59-197642 A | * | 11/1984 |
| JP | 11-200010 A | * | 7/1999 |
| JP | 2001-150074 A | * | 6/2001 |
| JP | 2004-43962 A | * | 2/2004 |

\* cited by examiner

*Primary Examiner*—Marcus Charles

(57) ABSTRACT

A belt for a continuously variable transmission (CVT) includes at least one continuous band supported against a contact face in a slot formed in each of a plurality of transverse elements of the CVT. The band has a surface positioned against the contact face. This surface is coated with chromium nitride by physical vapor deposition to reduce wear.

12 Claims, 2 Drawing Sheets

% DECREASE $R_{PK}$ FROM WEAR

| TEST LOAD | 100 N | 175 N |
|---|---|---|
| NO COATING | 67 | 56 |
| THIN CrN PVD (0.7 µm) | 49 | 52 |
| THICK CrN PVD (1.7 µm) | 10 | 14 |

CVT BELT WITH CHROMIUM NITRIDE COATING

TECHNICAL FIELD

The present invention relates to a CVT belt having a band with a chromium nitride coating to improve wear resistance.

BACKGROUND OF THE INVENTION

Continuously variable transmissions (CVTs) are a result of the continuing pursuit of more fuel-efficient motor vehicles. The CVT differs from the conventional automatic transmission in that automatic transmissions use planetary gear sets to accomplish speed ratio changes, whereas CVTs use pulleys and a belt to change speed ratio. A conventional automatic transmission usually offers four, five or six fixed ratios or speeds, whereas a CVT offers an infinite number of ratios which can be achieved by changing the relative radius of travel of the driving belt on the driving and driven pulleys.

The variator of the CVT includes two steel pulleys and a steel belt. Each pulley is comprised of two opposing angled sheaves, one moveable and one fixed. The pulleys can be opened and closed to allow the belt to travel at different radii by axial movement of the moveable sheave with respect to the fixed sheave. When the driving pulley is fully open (small radius of belt travel) and the driven pulley is fully closed (large radius of belt travel) very high speed reduction ratios are achieved. Conversely, when the driving pulley is fully closed (large radius of belt travel) and the driven pulley is fully open (small radius of belt travel) increases in output speed over input speed are achieved.

CVTs have become increasingly popular in recent years because they may provide improved fuel economy versus conventional step gear automatic transmissions, the ability to operate the engine at lower rpms over a wider range of the fuel economy schedule, smooth shifting, more efficient vehicle front end packaging, as well as manual transmission interchangeability and all-wheel drive compatibility. The application of CVTs into light duty vehicles, especially for future use in conjunction with vehicles having higher horse power engines, requires CVTs to have higher torque capacity and excellent durability or wear resistance of components.

A problem which can occur with current designs results from internal belt vibrations and can manifest itself as "belt shudder" or "scratch." Belt shudder is an objectionable vibration which has been found in certain CVT arrangements. This type of vibration begins to occur at relatively low mileages and can be commercially unacceptable. Belt shudder usually occurs during light throttle parking lot maneuvers, i.e., conditions under which less than ten percent throttle is applied, when the speed is in the range of 1400 to 2200 rpm. It usually occurs at a temperature below 80° C. Belt shudder is caused by a stick-slip phenomenon that occurs between the inner band and the element shoulder of the CVT belt. Belt shudder usually occurs when the cross-hatched surface of the inner band becomes polished down as a result of wear. The belt shudder occurs at the transition point at which the belt changes from a pull to a push torque transfer mechanism.

The two primary methods for reducing the incidence of belt shudder are calibration strategy and fluid development. Calibration helps avoid regions or conditions under which belt shudder occurs. Proper calibration reduces pressure during transition from push to pull to "ratio-around" the problem. Fluid with properly designed friction characteristics can help prevent stick-slip phenomenon. The desired friction characteristics include positively sloped friction coefficient versus sliding speed, or higher dynamic friction than static friction. This represents a significant technical challenge when trying to balance against the needs of other transmission requirements.

SUMMARY OF THE INVENTION

The present invention provides a CVT belt having improved wear resistance by providing a chromium nitride coating onto a contact surface of the continuous band of the belt which contacts the transverse element, thereby reducing or eliminating belt shudder.

More specifically, the invention provides a belt for a continuously variable transmission (CVT) including at least one continuous band supported against a contact face in a slot formed in each of a plurality of transverse elements. The continuous band has a surface positioned against the contact face. This surface is coated with chromium nitride to reduce wear. Preferably, the coating is achieved by physical vapor deposition, such as reactive gas sputtering or arc evaporation. The nitride coating is preferably between approximately 0.5 and 2.5 micrometers in thickness. More specifically, the nitride coating is approximately 1.3 to 1.8 micrometers in thickness, and preferably approximately 1.7 micrometers in thickness.

The continuous band is formed of a maraging steel with a nitride surface heat treatment. After the nitride coating is applied, the surface has a Vickers hardness of approximately 1500 to 3000 Hv.

A method of manufacturing the band, including applying a chromium nitride coating, may also include ultrasonically degreasing the band, ion cleaning the band in an argon plasma atmosphere, and applying the coating by reactive gas sputtering in a closed field unbalanced magnetron sputtering system.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
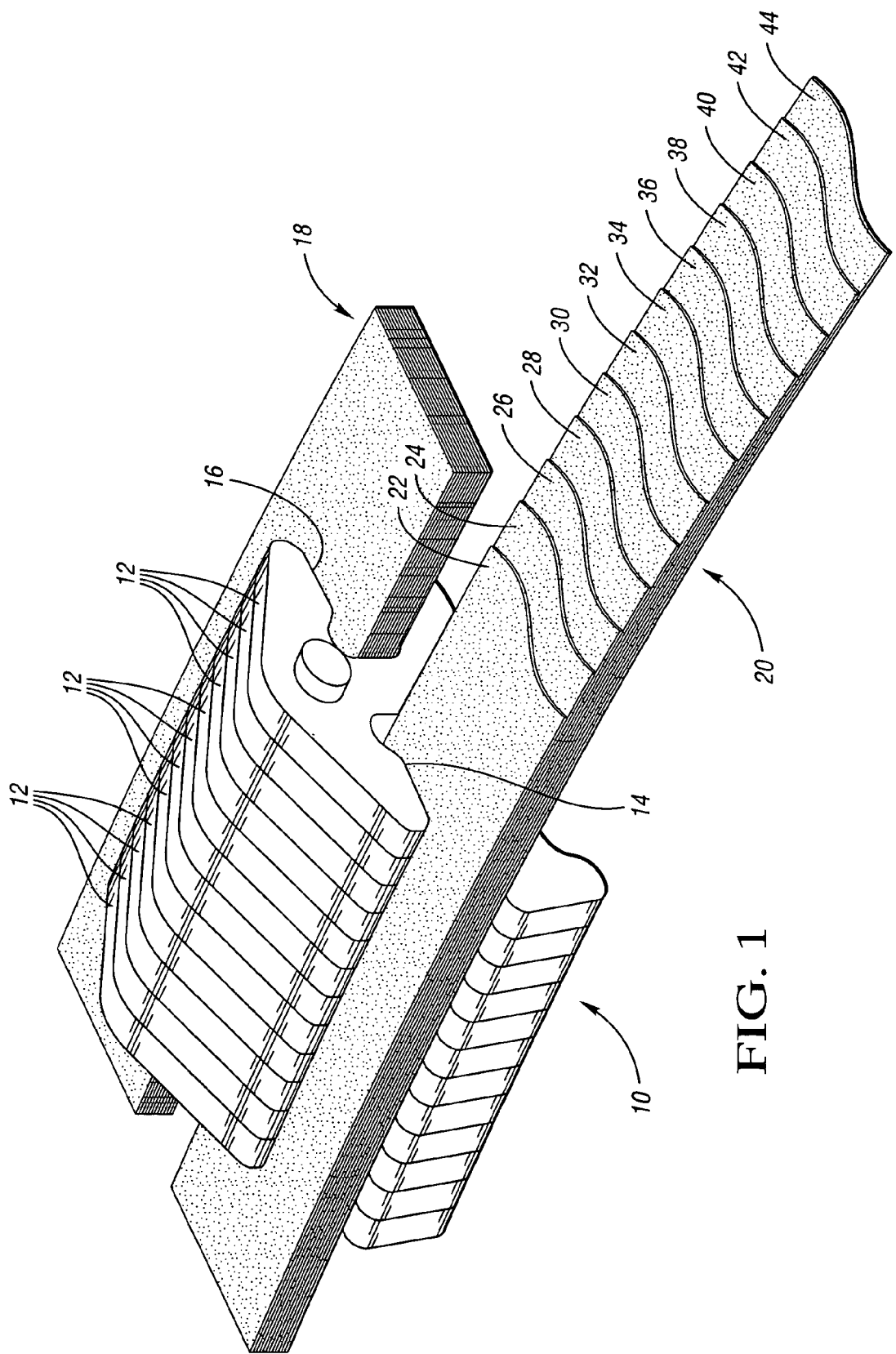
FIG. 1 shows a partial perspective view of a CVT belt for use with the present invention.

FIG. 1 shows a partial perspective view of a CVT belt 10 for use with the present invention. As shown, the CVT belt 10 includes a plurality of transverse elements 12 having opposing slots 14, 16 for receiving steel rings 18, 20. As shown, the ring 20 includes 12 continuous steel bands 22, 24, 26, 28, 30, 32, 34, 36, 38, 40, 42, 44. The continuous steel bands 22-44 are formed from a maraging steel with a nitride surface heat treatment. As viewed in FIG. 1, the top surface of each band 22-44 is machined smooth, and the lower surface is machined with a cross-hatch pattern. Each maraging steel band 22-44 has a chemical composition (weight percentage) of: Ni: 18.5%; Co: 8.9%; Mo: 4.8%; Ti: 0.39%; and Fe: balance.

Figures 2, 3:
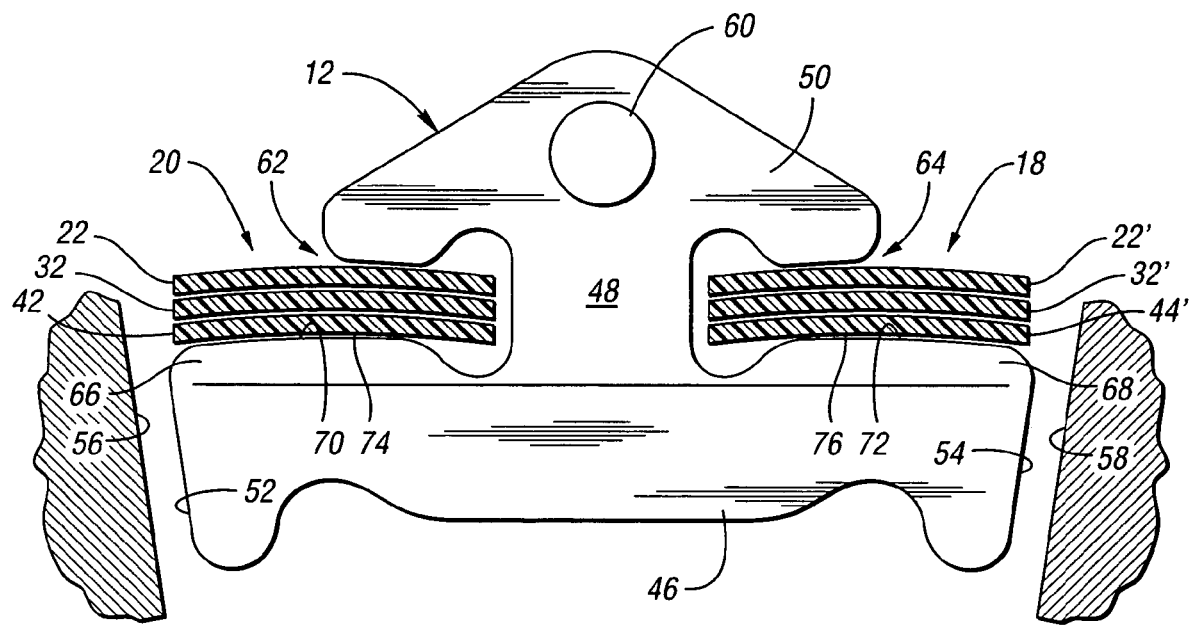
FIG. 2 shows a schematic cross-sectional view of a CVT belt in accordance with the invention.
FIG. 3 shows a chart illustrating Rpk decrease in percentage for different test components under different test loads.

FIG. 2 shows a schematic vertical cross-sectional view of the CVT belt 10 of FIG. 1, with only three of the bands 22-44 shown for simplicity. The bands are represented by reference numbers 22, 32, 44, 22' 32', 44'. The transverse element 12 shown in FIG. 2 is a low carbon steel component having a base 46, a neck 48 and a head 50. The base 46 has side faces 52, 54 positioned to contact the pulleys 56, 58, respectively. Each transverse element 12 also includes an alignment feature 60, such as a protusion, to facilitate alignment with adjacent transverse elements 12.

Open slots 62, 64 are formed between the head 50 and shoulders 66, 68, respectively, of the element 12. The slots 62, 64 receive the rings 20, 18, respectively. The shoulder 66 has a contact face 70 which engages the lower surface 74 of the continuous band 44, and the shoulder 68 has a contact face 72 which engages the lower surface 76 of the continuous band 44'.

Rubbing of the contact face 70 against the lower surface 74 and the contact face 72 against the lower surface 76 may lead to wear of the lower surfaces 74, 76, which may result in belt shudder, as described previously. Accordingly, the lower surfaces 74, 76 of the respective bands 44, 44' are coated with chromium nitride via physical vapor deposition to improve wear resistance.

The bands 44, 44' are cleaned ultrasonically before being loaded into a physical vapor deposition machine, such as an Unbalanced Magnetron Sputtering system (available from Teer Ltd. of England or Hauzer of Holland), or by arc evaporation. The thickness of the coating is preferably 1.7 micrometers, or between 0.5 and 2.5 micrometers. The deposition temperature is below 180° C. Arc evaporation PVD machines are available from Ionbond of Madison Heights, Mich.

Prior to physical vapor deposition, the bands are ultrasonically degreased in a 5% solution of an industrial degreaser, such as Blue Gold, and a 5% solution of an industrial cleaner, such as Contrad 70, while heated to 55° C. The bands are rinsed in de-ionized water after each 30 minute cleaning step. Final cleansing is achieved with a rinse of copious methanol.

After chemical cleaning, the chromium nitride deposition is achieved by first ion cleaning the surface of the bands for 30 minutes in an argon plasma atmosphere and a substrate bias of −400 V pulsed at a frequency of 250 kHz and 500 nsec pulse width. A 100 nm chromium interlayer is deposited in about four minutes as a bond coating at a similarly pulsed bias voltage of 100 V to enhance adhesion. The chromium target of 99.99% in a nitrogen containing argon environment is used. The base pressure of the system is about 1.3 exp (−4) Pa and the pressure during deposition is about 0.13 Pa. The gas is a mixture of 99.999% pure argon and 99.99% pure nitrogen. The nitrogen flow rate is varied between 10 and 75 standard cubic centimeters per minute (sccm) to provide different Cr/N ratio thin films. The CrN thin films are deposited onto the bands by reactive gas sputtering in the Closed Field Unbalanced Magnetron sputtering system. The CrN depositions are completed in 40 to 120 minutes while being similarly pulsed biased at 150 V. Hundreds or thousands of bands could be treated together simultaneously in such a process in a mass production environment.

In a test subject, the band surface roughness was approximately 675 nm Ra at 10× magnification. Accordingly, the roughness average did not change significantly as a result of the physical vapor deposition.

The coating hardness of the end product is in the range of 1500 to 3000 Hv (Vickers hardness), which is much harder than the original maraging steel band with the nitride surface heat treatment. Because the coating is very thin and deposited via sputtering or arc evaporation, it has a much stronger bonding to the substrate than any other types of coatings, such as plating or thermal spray. In addition, a chromium nitride coating has a better adhesion to the substrate than other coating materials such as titanium nitride and chromium carbide. The coating is not easy to debond from the substrate even in harsh temperature cyclical conditions.

Testing of chromium nitride coated bands has shown that the coated bands have little or no wear in comparison to uncoated bands, which experience substantial polishing wear. This result is illustrated in FIG. 3. FIG. 3 illustrates the decrease in percentage Rpk after a test cycle is performed to induce wear. Rpk is the measure of peak heights above the nominal/core roughness. As shown in FIG. 3, with a test load of 100 Newtons, a band having no coating experienced a 67% decrease in Rpk while a band with a thin (0.7 micrometer) chromium nitride coating experienced only a 49% decrease in Rpk percentage. Surprisingly, a band having a thick (1.7 micrometer) chromium nitride coating experienced only a 10% decrease in Rpk percentage. Similarly, under a 175 Newton test load, the uncoated band experienced a 56% decrease in Rpk, the band with the 0.7 micrometer chromium nitride coating experienced a 52% decrease in Rpk, and the band having 1.7 micrometer chromium nitride coating experienced only a 14% decrease in Rpk. These differences are substantial, and translate directly into a reduction or elimination of belt shudder since roughness of the surface of the belt which contacts the element is maintained due to the chromium nitride coating. This roughness stability eliminates the stick-slip phenomenon.

Supporting disclosure related to CVT belts may be found in U.S. Pat. Nos. 6,464,606; 6,497,633; 6,254,503, 6,337,309; and 6,451,745, each of which is hereby incorporated by reference in its entirety.

While the best modes for carrying out the invention have been described in detail, those familiar with the art to which this invention relates will recognize various alternative designs and embodiments for practicing the invention within the scope of the appended claims.

The invention claimed is:

1. A belt for a continuously variable transmission (CVT) comprising:
    at least one continuous band supported against a contact face in a slot formed in each of a plurality of transverse elements;
    said at least one continuous band constructed of maraging steel having a nitride surface heat treatment, and having a surface positioned against said contact face, wherein said surface is coated with chromium nitride to reduce wear, said chromium nitride coating being approximately 0.5 to 2.5 micrometers in thickness.

2. The belt of claim 1, wherein said chromium nitride coating is approximately 1.3 to 1.8 micrometers in thickness.

3. The belt of claim 2, wherein said chromium nitride coating is approximately 1.7 micrometers in thickness.

4. The belt of claim 2, wherein said chromium nitride coating is applied by physical vapor deposition.

5. The belt of claim 4, wherein said physical vapor deposition comprises reactive gas sputtering.

6. The belt of claim 4, wherein said physical vapor deposition comprises arc evaporation.

7. The belt of claim 1, wherein said chromium nitride coating has a Vickers hardness of approximately 1500 to 3000 Hv.

8. A belt for a continuously variable transmission (CVT) comprising:
- at least one continuous band supported against a contact face in a slot formed in each of a plurality of transverse elements; and
- said at least one continuous band having a surface positioned against said contact face, wherein said surface is coated with chromium nitride to reduce wear;
- wherein said chromium nitride coating is approximately 0.5 to 2.5 micrometers in thickness and has a Vickers hardness between approximately 1500 and 3000 Hv.

9. A method of manufacturing a band for a belt of a continuously variable transmission (CVT) to be supported against a contact face of each transverse element of the belt, the method comprising:
- forming the band of maraging steel with a nitride surface heat treatment, the band having a surface to be positioned against the contact face of each transverse element; and
- applying a chromium nitride coating on said surface by physical vapor deposition, said chromium nitride coating being approximately 0.5 to 2.5 micrometers in thickness.

10. The method of claim 9, wherein said physical vapor deposition comprises reactive gas sputtering.

11. The method of claim 9, wherein said physical vapor deposition comprises arc evaporation.

12. The method of claim 9, wherein said applying step further comprises:
- ultrasonically degreasing the band;
- ion cleaning the band in an argon plasma atmosphere; and
- applying the coating by reactive gas sputtering system in a closed field unbalanced magnetron sputtering system.

* * * * *